US012332908B2

(12) United States Patent
Gonel et al.

(10) Patent No.: US 12,332,908 B2
(45) Date of Patent: Jun. 17, 2025

(54) COMPACT ERROR TRACKING LOGS FOR ETL

(71) Applicant: SAP SE, Walldorf (DE)

(72) Inventors: Pascal Gonel, Paris (FR); Kamel Msalmi, Paris (FR); Alexandre Codjovi, Paris (FR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/816,829

(22) Filed: Aug. 2, 2022

(65) Prior Publication Data

US 2024/0045880 A1 Feb. 8, 2024

(51) Int. Cl.
*G06F 16/25* (2019.01)
*G06F 16/27* (2019.01)
*G06F 16/28* (2019.01)

(52) U.S. Cl.
CPC .......... *G06F 16/254* (2019.01); *G06F 16/273* (2019.01); *G06F 16/283* (2019.01)

(58) Field of Classification Search
CPC ..... G06F 16/254; G06F 16/273; G06F 16/283
See application file for complete search history.

(56) References Cited

U.S. PATENT DOCUMENTS

| | | | |
|---|---|---|---|
| 6,668,253 B1 * | 12/2003 | Thompson | G06Q 10/06 |
| 9,158,827 B1 * | 10/2015 | Vu | G06F 16/254 |
| 2014/0279838 A1 * | 9/2014 | Tsirogiannis | G06F 16/22 |
| | | | 707/603 |
| 2018/0075104 A1 * | 3/2018 | Oberbreckling | G06F 16/254 |
| 2019/0102411 A1 * | 4/2019 | Hung | G06F 16/21 |
| 2019/0207962 A1 * | 7/2019 | Wang | H04L 43/04 |
| 2019/0258736 A1 * | 8/2019 | Ocher | G06F 16/258 |
| 2020/0250172 A1 * | 8/2020 | Busjaeger | G06F 16/24552 |
| 2020/0327252 A1 * | 10/2020 | McFall | G06F 21/6254 |

OTHER PUBLICATIONS

Jesús et al. Apache Hive: "From MapReduce to Enterprise-grade Big Data Warehousing", Mar. 26, 2019 (Year: 2019).*

* cited by examiner

*Primary Examiner* — Matthew J Ellis
(74) *Attorney, Agent, or Firm* — Mintz Levin Cohn Ferris Glovsky and Popeo, P.C.

(57) ABSTRACT

In some implementations, there is provided initiating an extract transform and load from a first system to a second system; in response to the initiating, performing the extract transform and load by extracting input data at the first system, transforming the input data using one or more rules to form generated data, and loading the generated data into the second system; and during at least a portion of the extract transform and load, storing a data object including a snapshot and a log, wherein the snapshot includes the input data and the log indicates which of the one or more rules was applied to the row in the input data, and storing an aggregation table including a row identifier identifying a row of the generated data and further including a source identifying which rows in the input data were used to form the row of the generated data.

20 Claims, 7 Drawing Sheets

Data Object 400 (object store)

| input row idx | I_FSItem | I_SubItem | I_CostCenter | I_Amount | Log |
|---|---|---|---|---|---|
| 1 | A1412 | F45 | 955 | 1 | 3-1 |
| 2 | A1415 | F45 | 955 | 10 | 4-1/5-1 |
| 3 | A1415 | F55 | 975 | 100 | 4-1_CostCenter |

Snapshot of input data 204 ··· Log generated at 261

Aggregation Table 500

| aggregated row ID | source lines | Amount1 | Amount2 |
|---|---|---|---|
| 1 | 1-1/2-1 | 2/11 | 3/12 |
| 2 | 2-1 | 11 | 12 |

Data 600 (e.g., provided by third-party system)

data returned by the third-party system

| aggregated row ID | FSItem | SubItmCat | SubItm | ProfitCenter | ChartOfAcc | Amount1 | Amount2 |
|---|---|---|---|---|---|---|---|
| 1 | 141200 | 1 | 45 | 955 | 3 | 13 | 15 |
| 2 | 141222 | 1 | 955 | 955 | 3 | 11 | 12 |

FIG. 6

| aggregated row ID | source lines | Amount1 | Amount2 |
|---|---|---|---|
| 1 | 1-1/2-1 | 2/11 | 3/12 |

FIG. 7

Snapshot of input data obtained from object store | Log obtained from storage

| input row idx | I_FSItem | I_SubItem | I_CostCenter | I_Amount | Log |
|---|---|---|---|---|---|
| 1 | A1412 | F45 | 955 | 1 | 3-1 |
| 2 | A1415 | F45 | 955 | 10 | 4-1/5-1 |

FIG. 8

COMPACT ERROR TRACKING LOGS FOR ETL

TECHNICAL FIELD

This disclosure relates generally a database management system and, in particular, a compact error tracking logs for an extract, transform, and load process.

BACKGROUND

Database management systems have become an integral part of many computer systems. For example, some systems handle hundreds if not thousands of transactions per second (which in-turn can generate over time a large volume of corresponding data). On the other hand, some systems perform very complex multidimensional analysis on data. In both cases, the underlying database may need to handle responses to queries very quickly in order to satisfy systems requirements with respect to transaction time. Given the complexity of these queries and/or their volume, the underlying databases face challenges in order to optimize performance including use of resources, such as memory and storage.

SUMMARY

In some implementations, there is provided a method including initiating an extract transform and load from a first system to a second system; in response to the initiating, performing the extract transform and load by extracting input data at the first system, transforming the input data using one or more rules to form generated data, and loading the generated data into the second system; and during at least a portion of the extract transform and load, storing a data object including a snapshot and a log, wherein the snapshot includes the input data and the log indicates, for a row in the input data, which of the one or more rules was applied to the row in the input data, and storing an aggregation table including a row identifier identifying a row of the generated data and further including a source identifying which rows in the input data were used to form the row of the generated data.

In some variations, one or more of the features disclosed herein including the following features can optionally be included in any feasible combination. A query may be received regarding a given row in the generated data that was formed as part of the loading into the second system. The aggregation table may be stored by an extract transform and load engine to an in-memory database, such that when the query is received for the given row, the extract transform and load engine accesses the in-memory database to retrieve the aggregation table, which is then used to access an object store storing the data object that includes the snapshot and the log. In response to the received query, a response may be generated by at least accessing the aggregation table and the data object, wherein the response includes, based on the access to the data object, a portion of the input data which was used to generate the given row in the generated data, and wherein the response further includes an indication, based on the access to the aggregation table, regarding which of the one or more rules were applied to the given row. The response may be caused to be presented at a user interface. In response to the presentation of the response, feedback may be received in the form of a modification to at least one of the one or more rules of the extract transform and load, such that the extract transform and load can be re-executed with the modification. The extract transform and load may be initiated in response to a request message. The one or more rules each include a filter and an operation, such that the filter determines whether the operation is applied to the extracted input data.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Database systems and other types of data storage and warehousing technology can operate using a variety of different types of data and data structures. An extract, transform, and load (ETL) tool may be used to move data between systems, such as database systems, cloud stores, and other third party systems. Extract refers to the selection of a subset of the data (e.g., transactional data) at a data source (e.g., a database or a data warehouse); transform refers to applying a model (e.g., a set of rules) to the extracted input data to generate output data for a target system (e.g., a database or a data warehouse); load refers to providing the generated data to the target data system.

Figure 1:
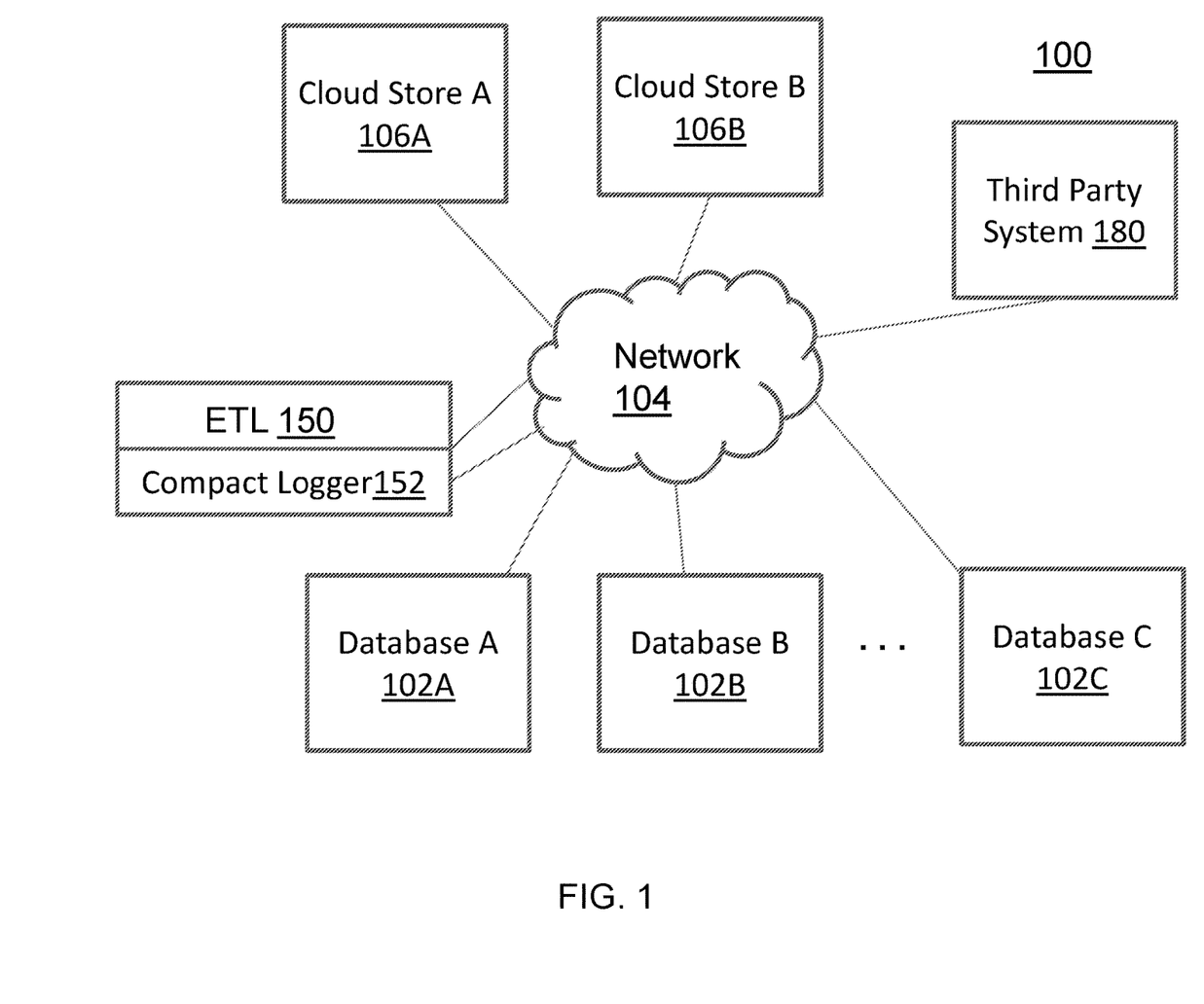
FIG. 1 depicts a block diagram of an example of a system including an extract transform and load tool and a compact logger, in accordance with some embodiments.

FIG. 1 depicts a block diagram depicting an example of a system 100 including a plurality of database management systems, such as a first database management system (labeled "Database A") 102A, a second database management system (labeled "Database B") 102B, a third database management system (labeled "Database C") 102A, a first cloud store (labeled "Cloud Store A") 106A, a second cloud store (labeled "Cloud Store B"), an extract transform and load tool 150, which further includes a compact logger 152, in accordance with some embodiments. The components 102A-C, cloud store 106A-B, ETL 150, and compact logger 152 may be coupled via at least network 104 (e.g., the Internet). Moreover, although FIG. 1 depicts a certain quantity of components (e.g., 102A-C, 106A-B, 180, 150, and 152), other quantities of each component may be realized as well.

In operations, an end-user (e.g., a customer) may access, via for example the third party system 180, a database 102A-C, a cloud store 106A-B, the ETL 150, and/or a compact logger 152 via for example a software as a service (SaaS), platform as a service (PaaS), and/or or infrastructure as a service (IaaS) arrangement. When this is the case, these systems may provide service(s) to the end user as well as other end users. To illustrate further, an end user may, via for example the third party system 180 (e.g., a client device including an application such as a browser or other type of application), access and interact with components 102A-C, 106A-B, 180, 150, and 152.

To illustrate operations further, an end user may access the third-party system 180 to request the ETL 150 to perform an extract, transform, and load from a first system, such as database 102A, to a second system 102B. In some embodiments, the ETL may trigger (e.g., request or cause) the compact logger 152 to track and/or record events (e.g., errors and other metadata associated with the extract, transform, and load process) in a compact log of events such as errors, in accordance with some embodiments. Before providing additional details regarding the ETL and the compact logger, the following provides additional information regarding the system 100.

The databases 102A-C may rely on the same or different storage or database technology. For example, the database 102A may be an online transaction processing (OLTP) system using a relational database system. An example of an OLTP system is the SAP S/4HANA™ enterprise resource planning (ERP) system. Furthermore, the databases may operate using for example the same or different storage technology, such as a row-oriented database system, a column-oriented database system, or a hybrid row-column store approach. Alternatively, or additionally, the database 102B may be for example an online analytic processing (OLAP) system using the same or different storage technology as the database 102A. Applications of OLAP systems include business reporting for sales, marketing, management reporting, business process management (BPM), budgeting, forecasting, financial reporting, and/or other types of analytics. An example of the OLAP system 104 is the SAP BW/4HANA™ data warehouse solution, which can be used to for example answer multi-dimensional analytical (MDA) queries.

The cloud stores 106A-B may be used to store the data processed by the database systems 102A-C. Examples of the cloud stores 106A-B include SAP™ data centers, Microsoft Azure™ data centers, Amazon Web Services™ data centers, Alibaba Cloud™ data centers, Google Cloud Platform™ data centers, a private data center, and/or the like.

As noted, the ETL 150 may be used to extract data from a first system (e.g., the database 102A or cloud store 106A), transform the data, and then load the transformed (or generated) data into a second system, such as the database 102B or C or cloud store 106B, for example. To illustrate, the ETL 150 may be used to control (or cause) the extract, transform, and load operations for data from a source system (e.g., Database 102A configured as an OLTP system) to a target system (e.g., Database 102C providing an OLAP type of system). In this example, an extract may pull a subset (e.g., purchase orders for a given date range) of the transactional data from the data source 102A. This extracted data serves as input to the transform phase. Next, the ETL transforms the input data according to a model (e.g., using filters and rules and/or other defined operation(s)). To illustrate, the extracted purchase order data may include prices in various currencies (e.g., Euros, Canadian dollars, etc.), and the transform operation may apply an exchange rate to the given currency price to generate data having a single currency price for each extracted record. To load, the transformed (or generated) data is loaded into the target system, such as database C 102C using for example remote system calls.

Although the ETL 150 is shown as being located in a separate system or component from the other systems or components (e.g., 106A-B and databases 102A-C), the ETL 150 may be located in (or as part of) one or more of these other systems or components.

In some embodiments, the compact logger 152 may be used to track and log errors generated during the ETL process. In some embodiments, the compact logger generates one or more logs having a compact format that enables an end-user to (1) identify the input data, (2) identify rules (and/or filters) applied to the input data, and/or (2) determine whether the rules were applied successfully or unsuccessfully.

As noted, the processing by the ETL 150 may be a complex process of accessing data structures at a first system to extract data which forms the input data for the ETL processing, transforming the input data using rules to form generated (or transformed) data, and then loading the generated (or transformed) data into a second system. Anywhere along the ETL process an error may occur. As such, it may be difficult to understand the nature of the error, what rules where successfully processed, unsuccessfully processed, the original source data of the extracted (input data).

To illustrate further, an end user may, via the third party system 180 for example, define a multitude of transformation rules (which for example may include filters and operations or other functions) to be applied by the ETL 150 on the input data to transform the input data into generated data for loading. At runtime, these rules are applied to a large volume of input data, some of which might be ignored (or not applied) for a variety of reasons (e.g., an error, etc.) while others portions of the input data are transformed and loaded into a target system. In this example, the end user can be faced with at least two types of problems. In the case of the ETL ignoring (or not transforming) a certain portion of the input data (e.g., a row or a column of the input data), the end user may have no idea why the input data was rejected (and not transformed) by the ETL. Without this insight, it would be difficult to assess for example whether the rejection was due to the input data itself or an error in the rule. For successfully generated data processed by one or more rules of the ETL, the end user may not be able to trace the transformed data back to its origin (e.g., what input data and what transformation rules or filters were used to generate the generated data) as ETL process may not keep the input data (e.g., given the storage and/or memory constraints, especially in an in-memory database environment).

In some embodiments, the ETL 150 (or compact logger 152 therein) may be used to generate a compact error tracking log for the ETL. This compact error tracking log may address one or more of the noted issues with ETL errors. Moreover, the compact error tracking log may be "compact" in the sense that it is compatible with systems in which memory or storage is limited or at a premium. In some embodiments, the compact logger 152 may be used to track and log errors (as well as other events) to enable identification of the errors. Alternatively, or additionally, the compact logger may enable the recovery of the original data input into the ETL process. Alternatively, or additionally, the compact logger may enable determining which rules were or were not applied to the input data during the transform phase of the ETL.

Although the compact logger 152 is shown as being located in the ETL 150, the compact logger 152 may be implemented as a standalone service or micro service, which can be called or queried by other systems including third party system 180, for example.

Figure 2:
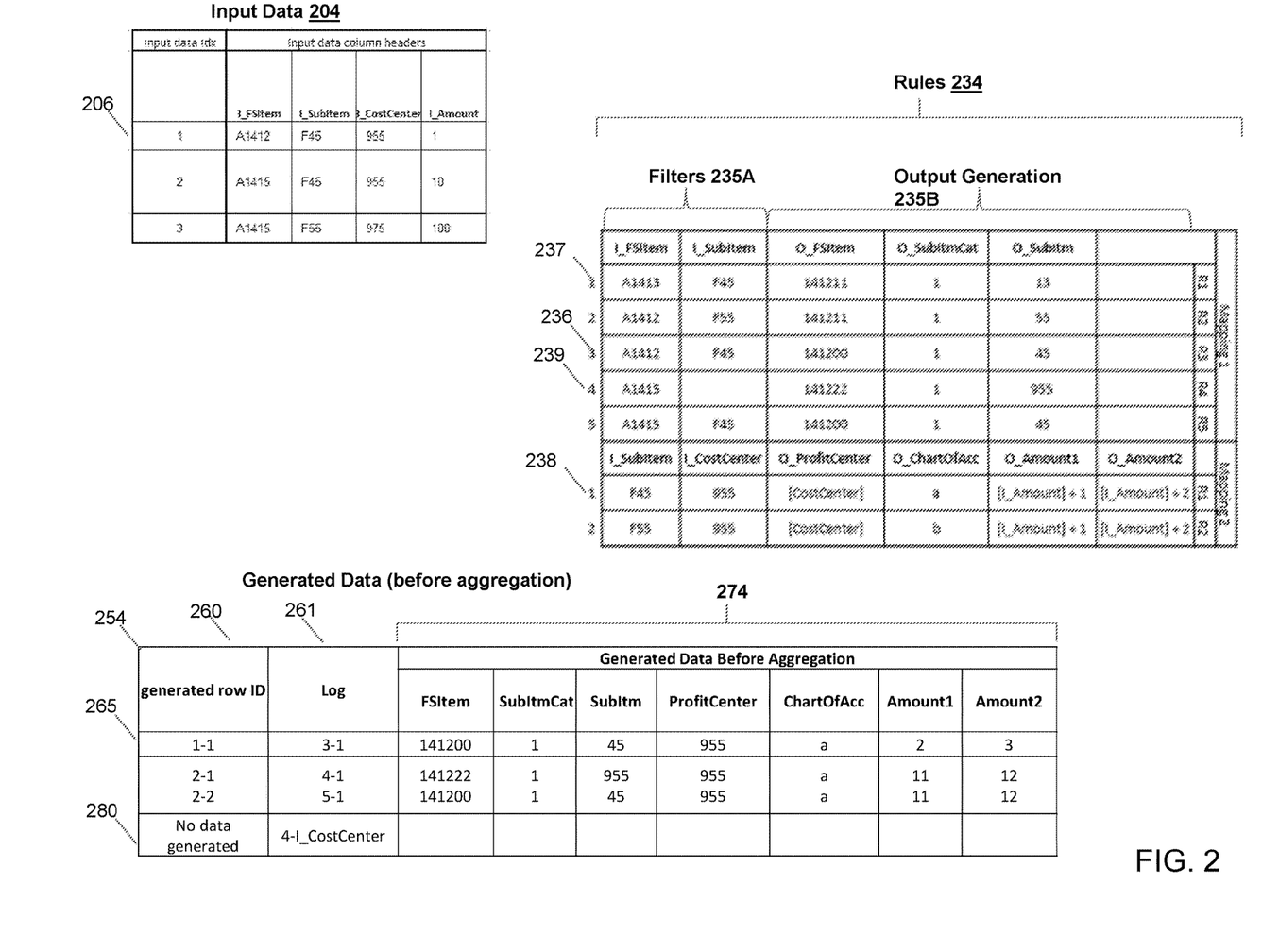
FIG. 2 depicts an example of extracted input data, rules, and generated data, in accordance with some embodiments.

FIG. 2 depicts an example of a subset of extracted input data 204 (extracted from a first system), one or more rules 234 used to transform the extracted (or input) data 204 to form the generated data 254 that will be loaded into a second system, in accordance with some embodiments.

In the example of FIG. 2, the input data 204 represents a portion of a table of database 102A that is extracted by the ETL 150. In this example, 3 rows corresponding to 4 columns, FS_Item, SubItem, CostCenter, and Amount, although other portions of the database 102A may have been extracted. As noted, the ETL may, at design time, be configured with a data model that defines the data structure (or how and what to extract) from the first system, such as database 102A. For example, the extraction may be performed by the ETL by sending a query for the extracted data to the database 102A.

The rules 234 refer to a model, such as rules, used by the ETL to transform the extracted input data to form generated data (which is may ultimately be loaded into a target system). For example, a rule may include a filter that can be used to identify if a portion (e.g., row, column, or field) of the input data is to be processed by an operation of the rule. At design time for example, the rules 234 depicted at FIG. 2 are configured to include the filters 235A and operations 235B, which generate the output 274 at generated data 254.

In the example of FIG. 2, the filters have the form I_<input column name>, which identifies the input column name being filtered in the input data, such as the input data 204. The output generation portion has the form of O_<output column name>, which specifies the operation and as such how to transform or generate the output data. For example, rule R1 237 at row 1 of the rules 234 includes a first filter (I_FSItem=A1413) and a second filter (I_SubItem=F45), so both of these filters must match the column headers of the input data 204 before the corresponding output generation portion 235B of R1 is applied to the matching row of the input data 204.

In the case of input data row 1 206, that row 1 data includes a first column name (I_FSItem) of A1412 and a second column name of (I_SubItem) of F45. To transform that row 1 data, a matching filter is identified. In this example, rules 1-2 (R1 and R2) have filters that do not match the input data (I_FSItem) of A1412 and (I_SubItem) of F45. However, rule R3 236 does match input data row 1 206 as both include a first column name (I_FSItem=A1412) and a second column name (I_SubItem=F45). Based on this match, an output is generated using the output generation portion 235B (e.g., at rule R3 236 the output generation corresponds to 141200, 1, and 45). In this example, the generated data is output as 141200, 1, and 45 as shown at generated row ID 1-1 of the generated output 265.

As noted, each input row of the input data 204 may be compared against each of the filters 235A, and if a filter portion matches an input data row, that matching input data row is transformed using the corresponding output generation portion 235B (which can define on a column-by-column basis a function, an operation, or other value to use in the transform).

In the example of FIG. 2, the rules 234 include two mappings group (although there may be more mapping group). The second mapping includes as filters a first column name (I_SubItem) and a second column name (I_Cost Center). In the case of input data row 1 206, it includes a column name (I_SubItem) of F45 and a column name (I_Cost Center) of 955, which matches the first filter 238 of the second mappings. Based on this match, an output is generated using the output generation portion 235B at row 238, which corresponds to [CostCenter], a, [I_Amount]+1, and [I_Amount]+2). In this example, the generated data 265 at row 1-1 for the second mapping is 955 (which indicates the CostCenter, a (which corresponds to a chart of account), 2 (which corresponds to 1 of I_Amount+1), and 3 (which corresponds to 1 of I_Amount+2).

In the example of FIG. 2, the first row "1" 206 of the input data 204 has matching rule 3 (R3) 236 of the first mapping applied and matching rule 1 (R1) 238 of the second mapping applied. Likewise, the second row "2" of the input data 204 has rules 4 (R4) and 5 (R5) of the first mappings applied and rule 1 (R1) of the second mappings applied. And, the third row of the input data 204 has rule 4 (R4) of the first mappings applied but none of the rules for the second mapping have been applied.

The generated data 254 (which results from the transform provided by the output generation portion 235B of the rules) includes a generated row ID 260. In some embodiments, this generated row ID 260 indicates the original input row from the input data 204 and an associated line number in the generated data. For example, the generated row ID 260 may have the following format:

<ID of the original input row>-<line number generated for this input row>.

For the generated row ID 1-1 260, the first "1" indicates that row 1 in the input data 204 was the original input row and the second "1" indicates it is the first "1" row for this row 1 in the generated data 254. And as the second row of the extracted data 204 matched 2 filters, generated row ID 2-1 indicates that row 2 in the input data 204 was the original input row and the "1" indicates the first row in the generated data 254. And, 2-2 indicates that row 2 in the input data 204 was the original input row and this is the second "2" row in the generated data 254 for input row 2.

In some embodiments, the generated data 254 may also include a log 261. The log indicates which rules (from rules 234) where used to generate the data in the generated data 265. For example, with "3-1", the value "3" indicates that R3 of the first mapping was used to generate the output data (e.g., 14200, 1, and 45) of row 1-1 265, and the value "1" indicates R1 rule of the second mapping was used to generate the output data (e.g., 955, a, 2, 3) of row 1-1 265. Likewise, "4-1" indicates that the R4 rule of the first mapping was used and R1 rule of the second mapping was used. In the example of FIG. 2, the filter 239 includes a blank at I_SubItem, which in this example represents a don't care (or in other words no filter so any value in the input data for I_SubItem satisfies this portion of the filter). In the last ow of the generated data 254, it indicates "No data generated" because although the filter for R4 (of the first mapping matched), none of the filters for the second mapping matched. As such, the log 261 may include information regarding why row 3 of the input data 204 was not transformed by the rules 234. In this example of row 3 of the input data 204, R2 partially matched (matched F55 but the 975 did not match the 955 of the I_CostCenter filter), so some relevant information regarding the failing partial match (e.g., I_CostCenter) may be provided in the log column 261 by indicating the "4-I_CostCenter."

Figure 3:
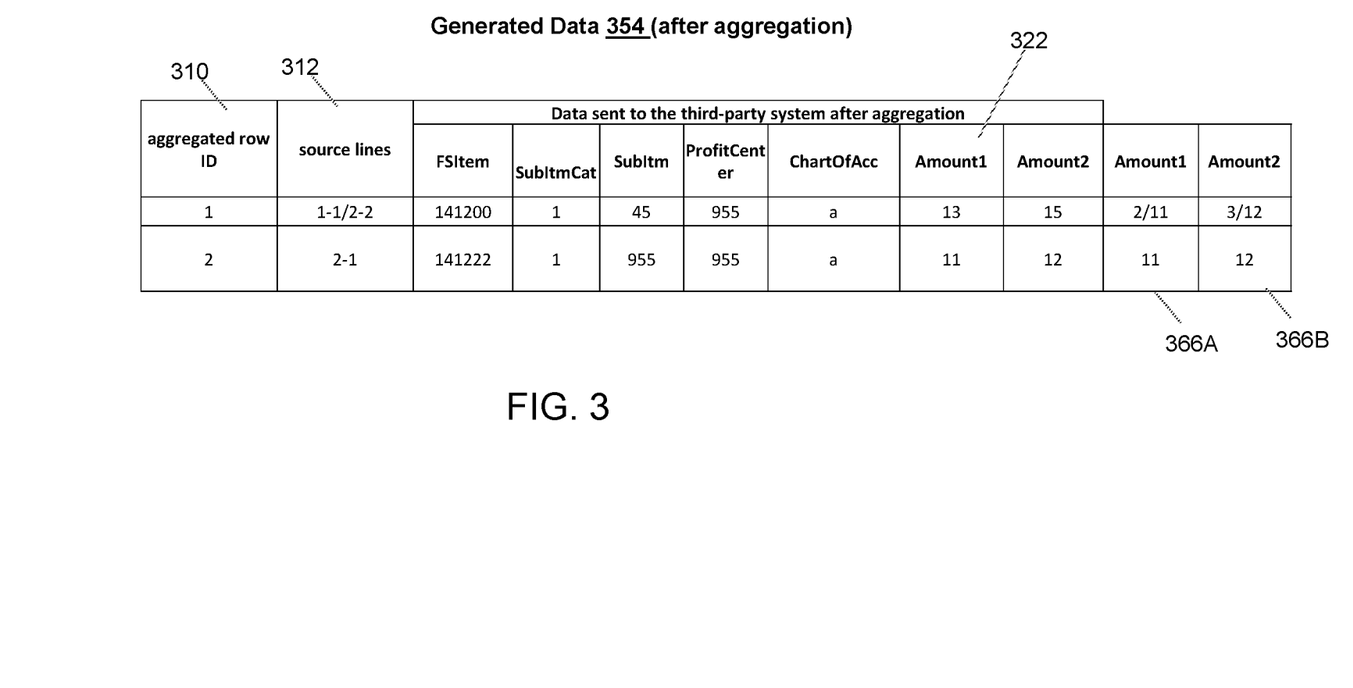
FIG. 3 depicts an example of generated data after aggregation, in accordance with some embodiments.

In some embodiments, the generated data 254 may be aggregated (e.g., combined) as shown at FIG. 3 at 354. For example, the generated data 254 may be provided to the third-party system 180 (or other system) to enable further processing and evaluation of the generated data. However, the generated data 254 may be aggregated as shown at 354 at FIG. 3, which depicts an aggregated data table 354.

In some embodiments, for each row at 254 (FIG. 2), if that row has generated data at 265, then the output values are listed at aggregate data table 354 (FIG. 3) along with the aggregated row ID, source lines (which indicates the source row information from 260), and additional details. If a row, such as the No data generated row 280 (FIG. 2) has not generated any data, that row (with no generated data) is captured by the log information at column 261.

To form the aggregate data table 354, an SQL aggregation may be performed on generated data 254 to form aggregated data 354. In some embodiments, the aggregation may also generate aggregated row IDs 310. For example, aggregated row 1 at 310 is the aggregation of 2 rows, namely rows at 254 having generated row IDs of 1-1 and 2-1 (which is indicated by the source lines 312 of 1-1/2-2). In some embodiments, the aggregation may also include additional details regarding the aggregation. For example, these additional details may relate to the calculated amounts. In this example at 322, the aggregated Amount1=13, which can be detailed as a value of "2" (which comes from row 1-1)+11 (which comes from row 2-1).

In some embodiments, the aggregated data may be loaded (e.g., provided, sent, or made accessible) to another system, such as the third party system 180 or another database or cloud store. For example, the third party system may further process the generated data (which may be aggregated as noted). As noted, the processing may include determining which rules were (or were not applied) and the original input data. The feedback provided by the ETL (as further described below) may enable processing and analysis that can allow the third party system (or user therein) to modify the rules (e.g., filters, operations, etc.) based on whether a rule processed the input data successfully or not, for example.

As noted, the ETL 150 can be tasked to process a large volume of input data (e.g., extracted data) by applying a large volume of mappings, filters, and rules and can be tasked to perform such processing while having a limited capacity for database storage. And, the aggregated data 354 may be loaded into another system (e.g., into a database management) and/or provided to a third party system 180 for other types of processing. As noted above, the aggregated data may associate the line(s) of the aggregated data (which was provided or generated by the ETL) to the original rows in the input data 204. Moreover, the transformation process noted above may eliminate the possibility of recovering the input data 204 (which was present at the start of the mapping) from the aggregate data 354. As a consequence, a snapshot of this input data 204 may be kept and stored using, for example, a cloud object store (e.g., a data storage architecture for large stores of unstructured data). Referring to FIG. 1, the ETL may store this snapshot at for example a cloud store A 106A or other storage mechanism which can be accessed by the ETP 150.

Figure 4:
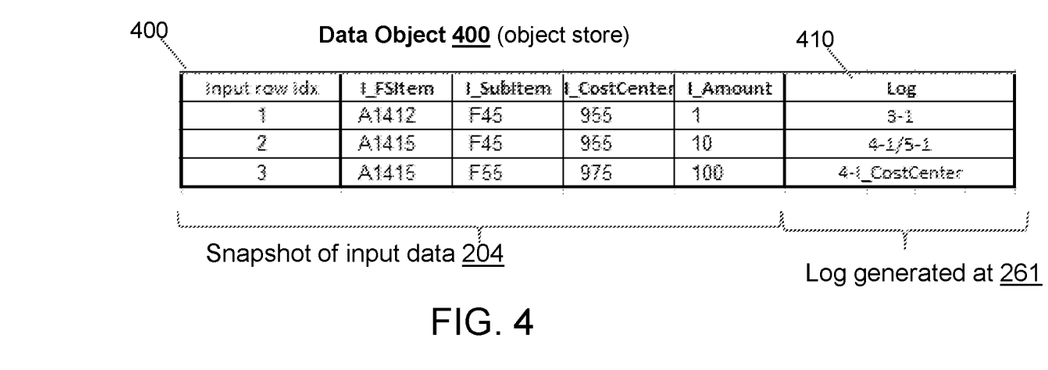
FIG. 4 depicts an example of a data object including a snapshot of the original input data and a log, in accordance with some embodiments.

FIG. 4 depicts an example of a data object 400 stored in a cloud object store by the ETL 150 (and/or compact logger 152), in accordance with some embodiments. The data object includes (or provides) a snapshot 204 of the original input data 204 and a log 410 (which was generated during the transformation stage as noted above at log 261 and provides metadata or information regarding which rules were used to generate the associated rule in the generated data output or other metadata/information). The data object 400 may be stored to enable the ETL to recover the original input data which has been transformed (and/or aggregated) and then provided or loaded into another system (so without the snapshot the ETL may not be able to readily recover the original input data). To illustrate further, after the aggregate data 354 is loaded into the third party system, the ETL 150 may need to be able to associate the aggregated data to the corresponding rows of the input data 204. To that end, the ETL may save the data object 400 as a snapshot of the input data and a corresponding log. Without the object data 400, the ETL may not be able to recover the original input data. In some embodiments, the object data is stored, as noted, in a cloud store in an unstructured format, such as CSV (comma-separated values) format as a way to reduce storage or memory usage.

Figure 5:
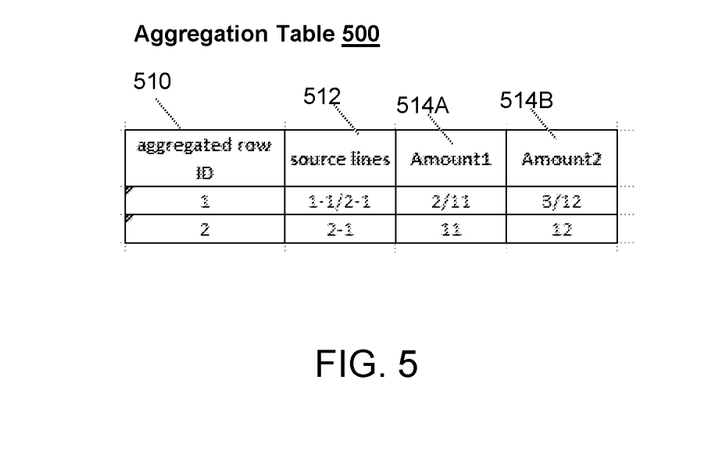
FIG. 5 depicts an example metadata obtained from the generated data, in accordance with some embodiments.

In addition to the data object 400, the ETL 150 (and/or compact logger 152) may store metadata generated during the aggregation phase in an aggregation table 500, an example of which is depicted at FIG. 5. The aggregation table 500 may include metadata obtained from the generated data 354. For example, aggregation table may include the aggregated row ID 510 (e.g., obtained from 310 at the generated data 354), source lines 512 (e.g., obtained from 312 at the generated data 354 so indicative of which input data rows were used to generate the aggregate data), and/or additional information/details 514A-B for the aggregation (e.g., obtained from 366A-B at the generated data 354). The aggregation table may be stored by the ETL as the only transaction data stored in the ETL's local (or coupled) database. In some embodiments, the aggregation table 500 may be considered compact (when compared to the data object 400, for example), and may serve as an entry point for the ETL (and/or compact logger) to recover or reconstitute the original input data (or a snapshot thereof), the applied rules, and the log (and/or other metadata).

In some embodiments, the ETL 150 may include (or be coupled to) a database, such as an in-memory database providing a structured database that can quickly query and return data, such as the aggregation table 500, while other data (e.g., larger snapshot, etc.) needed by the ETL may be stored in an unstructured storage format (e.g., CSV) in an external object store. With this two-tier storage architecture, the aggregate table 500 can be queried or accessed quickly to identify (for a given aggregate row ID) the source lines (e.g., and thus original input data rows) at the object store containing the snapshot and other metadata.

Figure 6:
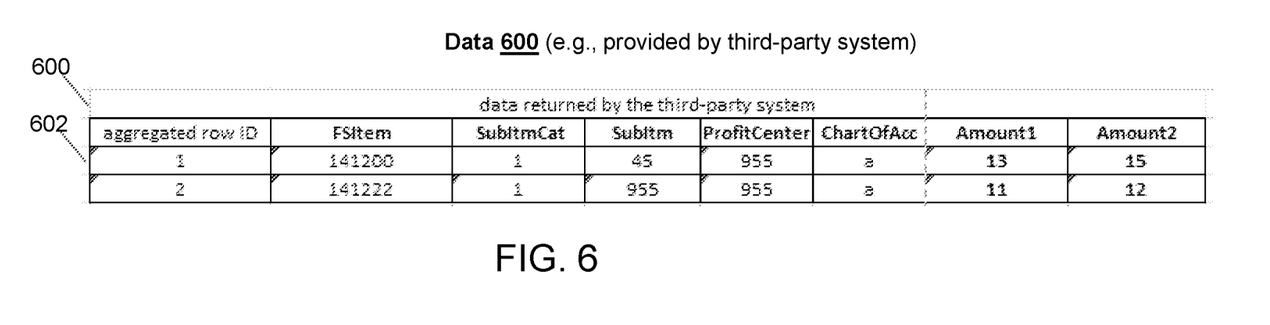
FIG. 6 depicts an example of data provided to an extract transform and load (ETL) tool, in accordance with some embodiments.

To render (or provide) information regarding the ETL process, a system, such as the third-party system 180, may return (or provide access to) the data 600 depicted at FIG. 6 to the ETL 150. In this example, the third-party system returns the data 600 to the ETL 150 to answer the following queries: (1) how was row 1 602 generated, (2) from what input data was row 1 generated, and (3) which rules were used in the transformation.

Figure 7:
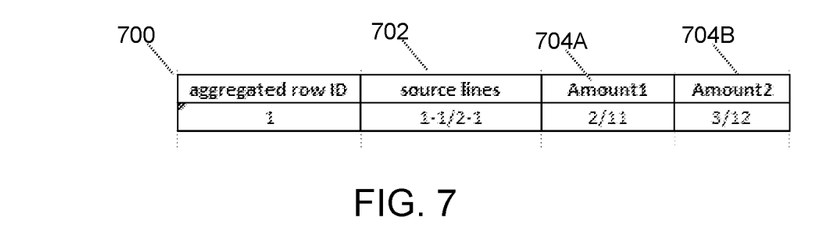
FIG. 7 depicts an example of metadata associated with a row in the generated data, in accordance with some example embodiments.

To answer the noted queries, the ETL 150 may query for row 1 the aggregation table 500 (which as noted was stored by the ETL/compact logger). In response, the ETL receives metadata from the aggregation table associated with row 1. FIG. 7 depicts an example of the metadata 700 associated with row 1.

The returned metadata 700 provides insight that can be used by the ETL 150 to provide information to the third party system. For example, the metadata 700 may provide insights into the following: row 1 is the result of the aggregation of 2 rows. This is determined from the source lines metadata 702, which indicates 1-1/2-1. As noted above, in 1-1, the first "1" indicates that row 1 was the original (or source row/line) input row in the input data 204 used to generate the generated data during the "transform" of the ETL. And in 2-1, the "2" indicates that row 2 was the original (or source row/line) input row in the input data 204 used to generate the generated data during the "transform" of the ETL Alternatively, or additionally, the metadata 700 may provide insights into the aggregation of row 1 with additional details 704A-B. For example, Amount1 and, in particular, that the "2" of Amount 1 comes from the first row (given 1-1) and 11 comes from the second row (given 2-1). And, Amount2 and, in particular, that the "3" comes from the first row (given 1-1) and 12 comes from the second row (given 2-1).

Figure 8:
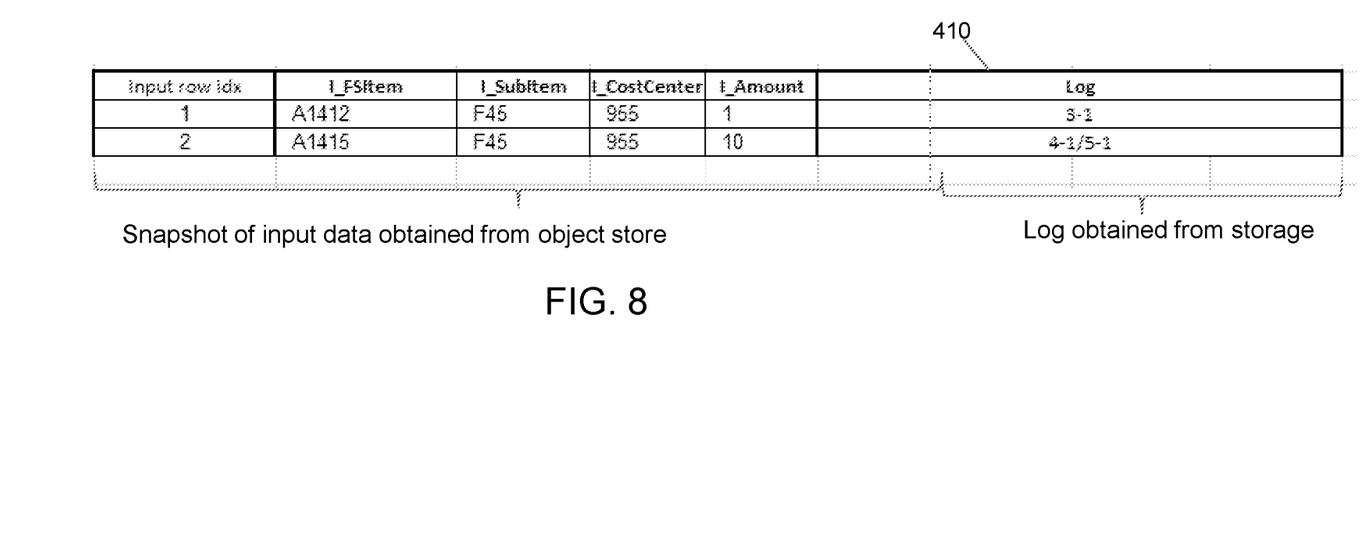
FIG. 8 depicts an example of the metadata including a snapshot of a portion of the input data and a log, in accordance with some example embodiments.

From the object store 400 that contains a snapshot of the input store, the ETL 150 may obtain rows 1 and 2 in the original input data 204. FIG. 8 depicts a table 800 obtained for rows 1 and 2 and, in particular, the original input data and associated log. Once obtained, the ETL 150 may generate at row 1 and 2. Moreover, the input rows 1 and 2 are at the origin of the generated line, so from the object store the original source lines may be obtained as shown by table 800 at FIG. 8. In this example, the object store was accessed to obtain the original input data and logs. The logs provide information regarding which rules were applied. At table 800, the first row "1" which corresponds as noted to the first row 206 of the input data. From the log, in "3-1", the value "3" indicates that R3 of the first mapping and R1 rule of the second mapping was applied to the input data. Likewise, "4-1" indicates that the R4 rule of the first mapping was used and R1 rule of the second mapping was used, and "5-1" indicates that the R5 rule of the first mapping was used and R1 rule of the second mapping was used.

Figure 9:
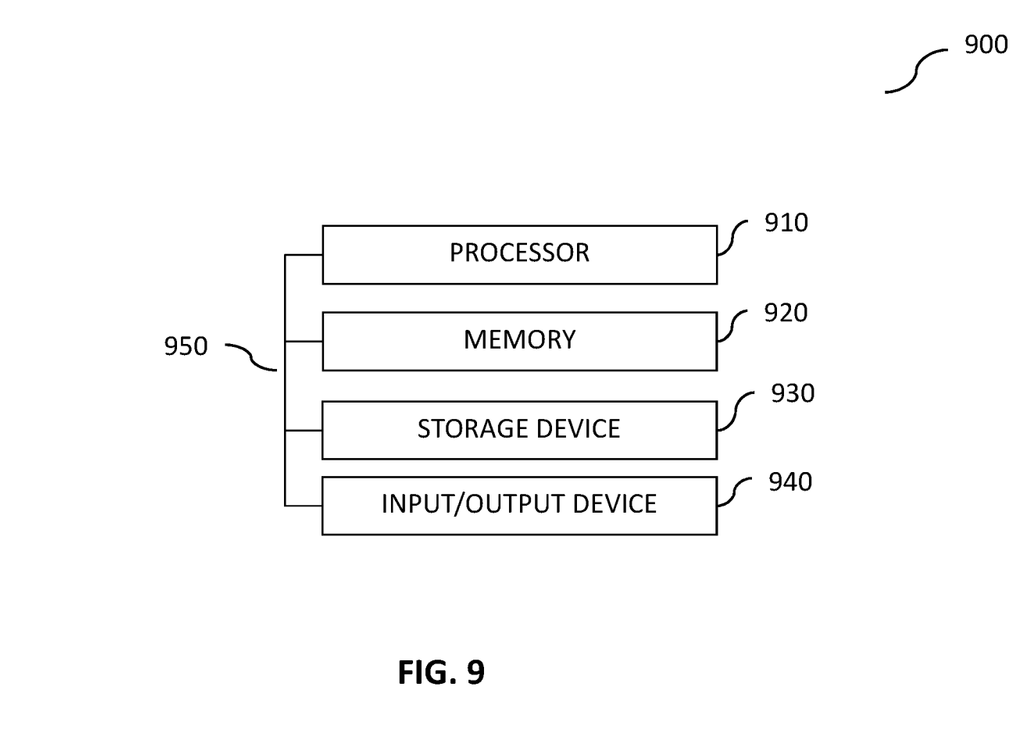
FIG. 9 depicts another example of a system, in accordance with some embodiments.

In some implementations, the current subject matter may be configured to be implemented in a system 900, as shown in FIG. 9. For example, the third party system 180, databases 102A-C, ETL 150 (also referred to as an ETL engine), compact logger 152, and/or other aspects disclosed herein may be at least in part physically comprised on system 900. To illustrate further system 900 may further an operating system, a hypervisor, and/or other resources, to provide virtualize physical resources (e.g., via virtual machines). The system 900 may include a processor 910, a memory 920, a storage device 930, and an input/output device 940. Each of the components 910, 920, 930 and 940 may be interconnected using a system bus 950. The processor 910 may be configured to process instructions for execution within the system 900. In some implementations, the processor 910 may be a single-threaded processor. In alternate implementations, the processor 910 may be a multi-threaded processor.

The processor 910 may be further configured to process instructions stored in the memory 920 or on the storage device 930, including receiving or sending information through the input/output device 940. The memory 920 may store information within the system 900. In some implementations, the memory 920 may be a computer-readable medium. In alternate implementations, the memory 920 may be a volatile memory unit. In yet some implementations, the memory 920 may be a non-volatile memory unit. The storage device 930 may be capable of providing mass storage for the system 900. In some implementations, the storage device 930 may be a computer-readable medium. In alternate implementations, the storage device 930 may be a floppy disk device, a hard disk device, an optical disk device, a tape device, non-volatile solid state memory, or any other type of storage device. The input/output device 940 may be configured to provide input/output operations for the system 900. In some implementations, the input/output device 940 may include a keyboard and/or pointing device. In alternate implementations, the input/output device 940 may include a display unit for displaying graphical user interfaces.

Figure 10:
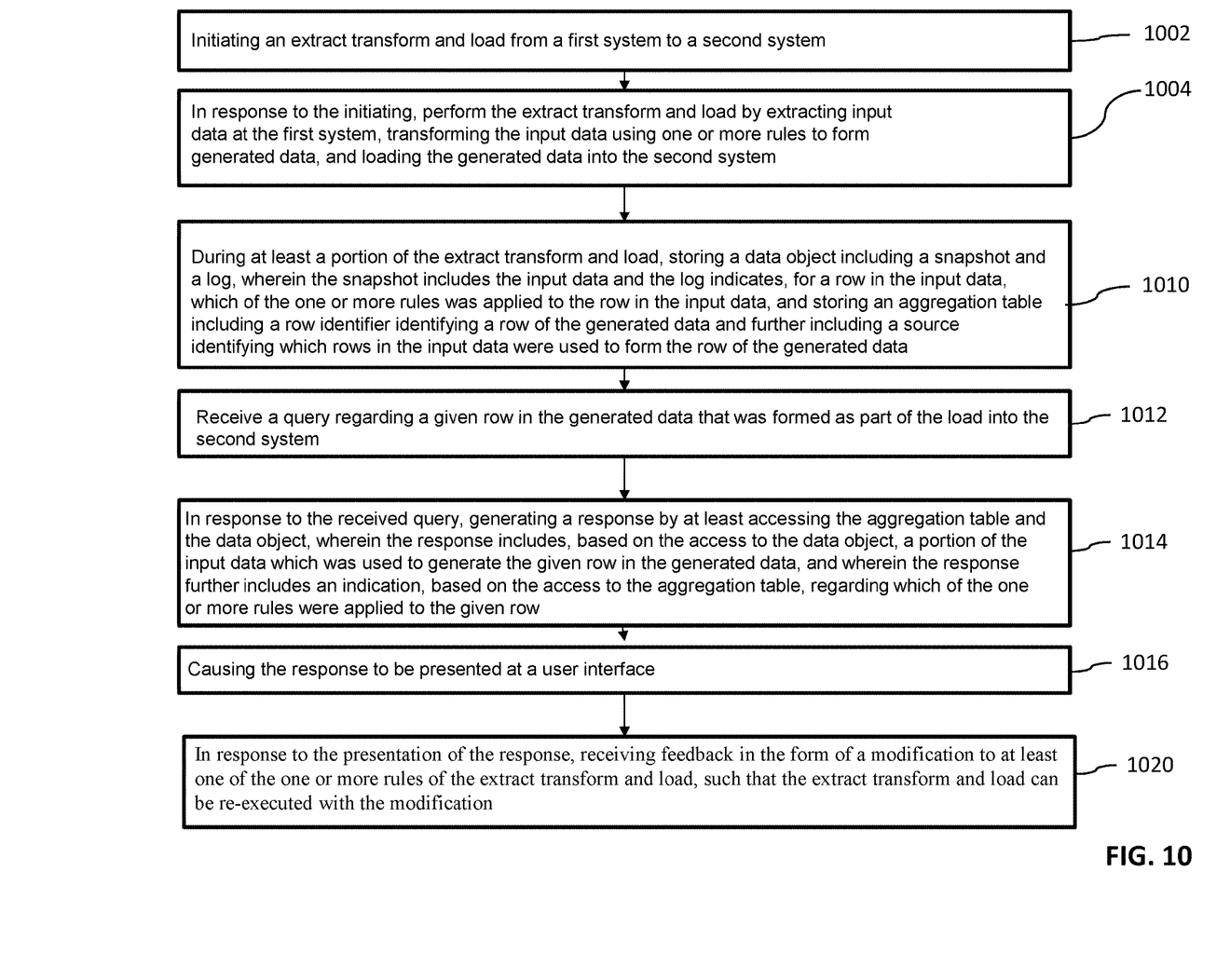
FIG. 10 depicts an example of a process for compact error tracking, in accordance with some embodiments.

FIG. 10 depicts an example of a process for compact logging of events such as errors, in accordance with some embodiments.

At 1002, an extract transform and load may be initiated from a first system to a second system. For example, the ETL 150 may receive from the third party system 180 or another device and/or system a request to initiate an ETL from a first system to a second system (e.g., from database 102A to database 102C). When the ETL 150 receives the request, the ETL may initiate the ETL process.

At 1004, in response to the initiating, the extract transform and load may be performed by extracting input data at the first system, transforming the input data using one or more rules to form generated data, and loading the generated data into the second system. For example, the extract transform and load may include extracting from a database, input data, such as input data 204 (FIG. 2). And, the ETL 150 may transform using for example rules 234 to form generated data 254. In some embodiments, the generated data is aggregated as described with respect to FIG. 4 above.

At 1010, during at least a portion of the extract transform and load, a data object including a snapshot and a log may be stored, wherein the snapshot includes the input data and the log indicates, for a row in the input data, which of the one or more rules was applied to the row in the input data. For example, the ETL 150 may store data object 400 (which as noted may be stored in an external object store at for example a cloud store 106A). The data object 400 includes a snapshot 204 of the original input data and a log 410 that indicates (for a given row in the input data) which of the one or more rules was applied to the row in the input data. To illustrate further, 3-1 at 410 indicates that indicates that R3 of the first mapping at 235 was used and R1 of the second mapping was used.

At 1010, an aggregation table may be stored, wherein the aggregation table includes a row identifier identifying a row of the generated data and further including a source identifying which rows in the input data were used to form the row of the generated data. For example, the ETL 150 may store an aggregation table, such as aggregation table 500. This aggregation table includes information such as an aggregated row ID (which corresponds to an identifier in the generated data (see, e.g., data 600) provided as an output to the third party system). The aggregation table at 500 also includes source line 512 metadata identifying which rows in the input data were used to form the row of the generated data.

At 1012, a query may be received regarding a given row in the generated data that was formed as part of the loading into the second system. For example, the ETL 150 may receive a query from the third-party system 180. This query may return (or provide access to) the data 600 to the ETL 150, such that the ETL can answer, as noted above, queries such as (1) how was row 1 602 generated, (2) from what input data was row 1 generated, and (3) which rules were used in the transformation.

At 1014, when the query is received, a response may be generated by at least accessing the aggregation table and data object, wherein the response includes, based on the access to the data object, a portion of the input data which was used to generate the given row in the generated data, and wherein the response further includes an indication, based on the access to the aggregation table, regarding which of the one or more rules were applied to the given row. For example, the ETL may access (via the aggregation table 500) the data object 400 to provide (as part of the response) (1) a snapshot portion of the input data which was used to generate the given row in the generated data (which was provided at 1014) and (2) an indication regarding which of the one or more rules were applied to the given row.

At 1016, the response may be caused to be presented on a user interface. For example, the ETL 150 may provide to the third party system 180 a response, such as a response as shown at FIG. 8, and cause that response to be presented at a UI of the third party system. This presentation enables the third party system to review the rules and if needed (edit or modify rules such as rules which are in error). And at 1020, the ETL may receive as feedback a modification to at least one of the one or more rules of the extract transform and load, such that the extract transform and load can be re-executed with the modification to for example the one or more rules.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A computer-implemented method, comprising: initiating an extract transform and load from a first system to a second system; in response to the initiating, performing the extract transform and load by extracting input data at the first system, transforming the input data using one or more rules to form generated data, and loading the generated data into the second system; and during at least a portion of the extract transform and load, storing a data object including a snapshot and a log, wherein the snapshot includes the input data and the log indicates, for a row in the input data, which of the one or more rules was applied to the row in the input data, and store an aggregation table including a row identifier identifying a row of the generated data and further including a source identifying which rows in the input data were used to form the row of the generated data.

Example 2: The computer-implemented method of Example 1 further comprising: receive a query regarding a given row in the generated data that was formed as part of the loading into the second system.

Example 3: The computer-implemented method of any of Examples 1-2, wherein the aggregation table is stored by an extract transform and load engine to an in-memory database, such that when the query is received for the given row, the extract transform and load engine accesses the in-memory database to retrieve the aggregation table, which is then used to access an object store storing the data object that includes the snapshot and the log.

Example 4: The computer-implemented method of any of Examples 1-3 further comprising: in response to the received query, generating a response by at least accessing the aggregation table and the data object, wherein the response includes, based on the access to the data object, a portion of the input data which was used to generate the given row in the generated data, and wherein the response further includes an indication, based on the access to the aggregation table, regarding which of the one or more rules were applied to the given row.

Example 5: The computer-implemented method of any of Examples 1-4 further comprising: causing the response to be presented at a user interface.

Example 6: The computer-implemented method of any of Examples 1-5 further comprising: in response to the presentation of the response, receiving feedback in the form of a modification to at least one of the one or more rules of the extract transform and load, such that the extract transform and load can be re-executed with the modification.

Example 7: The computer-implemented method of any of Examples 1-6, wherein the extract transform and load is initiated in response to a request message.

Example 8: The computer-implemented method of any of Examples 1-7, wherein the one or more rules each include a filter and an operation, such that the filter determines whether the operation is applied to the extracted input data.

Example 9: A system comprising: at least one processor; and at least one memory including program code, which when executed by at least one memory causes operations comprising: initiating an extract transform and load from a first system to a second system; in response to the initiating, performing the extract transform and load by extracting input data at the first system, transforming the input data using one or more rules to form generated data, and loading the generated data into the second system; and during at least a portion of the extract transform and load, storing a data object including a snapshot and a log, wherein the snapshot includes the input data and the log indicates, for a row in the input data, which of the one or more rules was applied to the row in the input data, and storing an aggregation table including a row identifier identifying a row of the generated data and further including a source identifying which rows in the input data were used to form the row of the generated data.

Example 10: The system of Example 9 further comprising: receive a query regarding a given row in the generated data that was formed as part of the loading into the second system.

Example 11: The system of any of Examples 9-10, wherein the aggregation table is stored by an extract transform and load engine to an in-memory database, such that when the query is received for the given row, the extract transform and load engine accesses the in-memory database to retrieve the aggregation table, which is then used to access an object store storing the data object that includes the snapshot and the log.

Example 12: The system of any of Examples 9-11 further comprising: in response to the received query, generating a response by at least accessing the aggregation table and the data object, wherein the response includes, based on the access to the data object, a portion of the input data which was used to generate the given row in the generated data, and wherein the response further includes an indication, based on the access to the aggregation table, regarding which of the one or more rules were applied to the given row.

Example 13: The system of any of Examples 9-12 further comprising: causing the response to be presented at a user interface.

Example 14: The system of any of Examples 9-13 further comprising: in response to the presentation of the response, receiving feedback in the form of a modification to at least one of the one or more rules of the extract transform and load, such that the extract transform and load can be re-executed with the modification.

Example 15: The system of any of Examples 9-14, wherein the extract transform and load is initiated in response to a request message.

Example 16: The system of any of Examples 9-15, wherein the one or more rules each include a filter and an operation, such that the filter determines whether the operation is applied to the extracted input data.

Example 17: A non-transitory computer-readable storage medium including program code, which when executed by at least one memory causes operations comprising: initiating an extract transform and load from a first system to a second system; in response to the initiating, performing the extract transform and load by extracting input data at the first system, transforming the input data using one or more rules to form generated data, and loading the generated data into the second system; and during at least a portion of the extract transform and load, storing a data object including a snapshot and a log, wherein the snapshot includes the input data and the log indicates, for a row in the input data, which of the one or more rules was applied to the row in the input data, and storing an aggregation table including a row identifier identifying a row of the generated data and further including a source identifying which rows in the input data were used to form the row of the generated data.

Example 18: The non-transitory computer-readable storage medium of Example 177 further comprising: receive a query regarding a given row in the generated data that was formed as part of the loading into the second system.

Example 19: The non-transitory computer-readable storage medium of any of Examples 17-18, wherein the aggregation table is stored by an extract transform and load engine to an in-memory database, such that when the query is received for the given row, the extract transform and load engine accesses the in-memory database to retrieve the aggregation table, which is then used to access an object store storing the data object that includes the snapshot and the log.

Example 20: The non-transitory computer-readable storage medium of any of Examples 17-19 further comprising: in response to the received query, generating a response by at least accessing the aggregation table and the data object, wherein the response includes, based on the access to the data object, a portion of the input data which was used to generate the given row in the generated data, and wherein the response further includes an indication, based on the access to the aggregation table, regarding which of the one or more rules were applied to the given row.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:

initiating an extract transform and load from a first system to a second system;

in response to the initiating, performing the extract transform and load by extracting input data at the first system, transforming the input data using one or more rules to form generated data, and loading the generated data into the second system;

during at least a portion of the extract transform and load, storing a data object including a snapshot and a log having a compact form, wherein the snapshot includes the generated data and the log indicates, for a row in the generated data, which of the one or more rules was used to form the row in the generated data, wherein a format of the log includes a first identifier followed by a second identifier, wherein the first identifier identifies which rule of a first mapping was used to form the row of the generated data, and wherein the second identifier identifies which rule of a second mapping was used to form the row of the generated data, and storing an aggregation table including an aggregated row identifier identifying a row of the generated data and further including one or more source row identifiers identifying which one or more rows in the input data were used to form the row of the generated data;

in response to a received query, generating a response by at least accessing the aggregation table and the data object, wherein the response includes, based on the access to the data object, a portion of the input data which was used to generate a given row in the generated data, and wherein the response further includes an indication, based on the access to the aggregation table, regarding which of the one or more rules were applied to the given row; and in response to presenting the response, receiving feedback in the form of a modification to at least one of the one or more rules of the extract transform and load, and re-executing the extract transform and load with the modification.

2. The computer-implemented method of claim 1, wherein each rule of the one or more rules comprises a filter used to identify if a portion of the input data is to be processed by an operation of the rule, and wherein a row of the generated data has a format including an identifier of an original input row followed by a line number generated for the original input row.

3. The computer-implemented method of claim 2, wherein the aggregation table is stored by an extract transform and load engine to an in-memory database, such that when the query is received for the given row, the extract transform and load engine accesses the in-memory database to retrieve the aggregation table, which is then used to access an object store storing the data object that includes the snapshot and the log.

4. The computer-implemented method of claim 2, wherein the filter comprises an input generation portion identifying an input column name and an output generation portion specifying the operation and how to transform the portion of the input data.

5. The computer-implemented method of claim 4 further comprising associating the generated data to corresponding rows of the input data by accessing the aggregation table.

6. The computer-implemented method of claim 4 further comprising determining that the filter matches a column header of the portion of the input data before applying the output generation portion to a matching row of the input data.

7. The computer-implemented method of claim 1, wherein the log of the aggregation table includes information regarding why one or more rows of the input data were not transformed by the one or more rules.

8. The computer-implemented method of claim 1, wherein the one or more rules each include a filter and an operation, such that the filter determines whether the operation is applied to the extracted input data.

9. A system comprising:
   at least one processor; and
   at least one memory including program code, which when executed by the at least one processor causes operations comprising:
      initiating an extract transform and load from a first system to a second system;
      in response to the initiating, performing the extract transform and load by extracting input data at the first system, transforming the input data using one or more rules to form generated data, and loading the generated data into the second system;
      during at least a portion of the extract transform and load,
      storing a data object including a snapshot and a log having a compact form, wherein the snapshot includes the generated data and the log indicates, for a row in the generated data, which of the one or more rules was used to form the row in the generated data, wherein a format of the log includes a first identifier followed by a second identifier, wherein the first identifier identifies which rule of a first mapping was used to form the row of the generated data, and wherein the second identifier identifies which rule of a second mapping was used to form the row of the generated data, and
      storing an aggregation table including an aggregated row identifier identifying a row of the generated data and further including one or more source row identifiers identifying which one or more rows in the input data were used to form the row of the generated data;
      in response to a received query, generating a response by at least accessing the aggregation table and the data object, wherein the response includes, based on the access to the data object, a portion of the input data which was used to generate a given row in the generated data, and wherein the response further includes an indication, based on the access to the aggregation table, regarding which of the one or more rules were applied to the given row; and
      in response to presenting the response, receiving feedback in the form of a modification to at least one of the one or more rules of the extract transform and load, and re-executing the extract transform and load with the modification.

10. The system of claim 9, wherein each rule of the one or more rules comprises a filter used to identify if a portion of the input data is to be processed by an operation of the rule, and wherein a row of the generated data has a format including an identifier of an original input row followed by a line number generated for the original input row.

11. The system of claim 10, wherein the aggregation table is stored by an extract transform and load engine to an in-memory database, such that when the query is received for the given row, the extract transform and load engine accesses the in-memory database to retrieve the aggregation table, which is then used to access an object store storing the data object that includes the snapshot and the log.

12. The system of claim 10, wherein the filter comprises an input generation portion identifying an input column name and an output generation portion specifying the operation and how to transform the portion of the input data.

13. The system of claim 12 further comprising associating the generated data to corresponding rows of the input data by accessing the aggregation table.

14. The system of claim 13, wherein the operations further comprise determining that the filter matches a column header of the portion of the input data before applying the output generation portion to a matching row of the input data.

15. The system of claim 9, wherein the log of the aggregation table includes information regarding why one or more rows of the input data were not transformed by the one or more rules.

16. The system of claim 9, wherein the one or more rules each include a filter and an operation, such that the filter determines whether the operation is applied to the extracted input data.

17. A non-transitory computer-readable storage medium including program code, which when executed by at least one processor causes operations comprising:
   initiating an extract transform and load from a first system to a second system;
   in response to the initiating, performing the extract transform and load by extracting input data at the first system, transforming the input data using one or more rules to form generated data, and loading the generated data into the second system;
   during at least a portion of the extract transform and load,
   storing a data object including a snapshot and a log having a compact form, wherein the snapshot includes the generated data and the log indicates, for a row in the generated data, which of the one or more rules was used to form the row in the generated data, wherein a format of the log includes a first identifier followed by a second identifier, wherein the first identifier identifies which rule of a first mapping was used to form the row of the generated data, and wherein the second identifier identifies which rule of a second mapping was used to form the row of the generated data, and
   storing an aggregation table including an aggregated row identifier identifying a row of the generated data and further including one or more source row identifiers identifying which one or more rows in the input data were used to form the row of the generated data;
   in response to a received query, generating a response by at least accessing the aggregation table and the data object, wherein the response includes, based on the access to the data object, a portion of the input data which was used to generate a given row in the generated data, and wherein the response further includes an indication, based on the access to the aggregation table, regarding which of the one or more rules were applied to the given row; and
   in response to presenting the response, receiving feedback in the form of a modification to at least one of the one or more rules of the extract transform and load, and re-executing the extract transform and load with the modification.

18. The non-transitory computer-readable storage medium of claim 17, wherein each rule of the one or more rules comprises a filter used to identify if a portion of the input data is to be processed by an operation of the rule, and wherein a row of the generated data has a format including an identifier of an original input row followed by a line number generated for the original input row.

19. The non-transitory computer-readable storage medium of claim 18, wherein the aggregation table is stored by an extract transform and load engine to an in-memory database, such that when the query is received for the given row, the extract transform and load engine accesses the in-memory database to retrieve the aggregation table, which is then used to access an object store storing the data object that includes the snapshot and the log.

20. The non-transitory computer-readable storage medium of claim 18, wherein the filter comprises an input generation portion identifying an input column name and an output generation portion specifying the operation and how to transform the portion of the input data.

* * * * *